United States Patent [19]

Takayanagi et al.

[11] Patent Number: 4,894,180

[45] Date of Patent: Jan. 16, 1990

[54] LIQUID CRYSTAL OPTICAL ELEMENT

[75] Inventors: Takashi Takayanagi; Hideo Kawaguchi, both of Fujinomiya, Japan

[73] Assignee: Fuji Photo Film Co., Ltd., Kanagawa, Japan

[21] Appl. No.: 141,381

[22] Filed: Jan. 7, 1988

[30] Foreign Application Priority Data

Jan. 7, 1987 [JP] Japan ................................. 62-1383
Jan. 8, 1987 [JP] Japan ................................. 62-2465

[51] Int. Cl.$^4$ ............................................. C09K 19/52
[52] U.S. Cl. ............................ 252/299.01; 252/299.5; 252/299.62; 252/299.66; 350/331 R; 350/347 E
[58] Field of Search ............... 252/299.4, 299.5, 583, 252/299.01, 299.66, 299.62; 350/331 R, 347 E

[56] References Cited

U.S. PATENT DOCUMENTS 4,059,340 10/1977 Kahn ........................ 350/160 L C
4,076,646  2/1978 Nakano ...................... 252/299.01
4,469,408  9/1984 Kruger .......................... 350/340

OTHER PUBLICATIONS

Shibaev, V.; Platé, N.; Thermotropic Liquid-Crystalline Polymers with Mesogenic Side Groups in Advances in Polymer Science, 60/61, M. Gordon, Ed., Springer Verlag, Berlin, 1984, pp. 173–252.

*Primary Examiner*—Teddy S. Gron
*Assistant Examiner*—Richard Treanor
*Attorney, Agent, or Firm*—Sughrue, Mion, Zinn, Macpeak & Seas

[57] ABSTRACT

A liquid crystal optical element comprising a polymeric liquid crystal composition is disclosed, wherein the composition contains at least one compound selected from adamantane, an adamantane derivative, terphenyl, and a terphenyl derivative in an amount of from 0.01 to 15% by weight based on a polymeric liquid crystal. The optical element exhibits uniform vertical orientation.

10 Claims, 1 Drawing Sheet

LIQUID CRYSTAL OPTICAL ELEMENT

FIELD OF THE INVENTION

This invention relates to a liquid crystal optical element suitable for use in information recording media utilizing memory effects of liquid crystals, display devices, and the like.

BACKGROUND OF THE INVENTION

Extensive studies on memory materials or display materials using nematic liquid crystals have recently been conducted as described, e.g., in Japanese Patent Application (OPI) Nos. 125247/83 and 10930/84 (the term "OPI" as used herein refers to a "published unexamined Japanese patent application"). The conventional techniques, however, have difficulty obtaining the uniform orientation necessary to produce a sufficient contrast.

SUMMARY OF THE INVENTION

One object of this invention is to provide a liquid crystal optical element comprising polymeric liquid crystals having improved orientation properties.

It has now been found that this object can be accomplished through the employment of a liquid crystal optical element comprising a polymeric liquid crystal composition having added therein at least one compound selected from the group consisting of adamantane, an adamantane derivative, terphenyl, and a terphenyl derivative.

BRIEF DESCRIPTION OF THE ACCOMPANYING DRAWINGS

FIGS. 1 to 4 each show an example of an optical element to which the present invention is applied. Numerals 1, 2, 3 and 4 as used in these figures indicate a base, a transparent conductive layer, an orientating layer, and a liquid crystal layer, respectively.

DETAILED DESCRIPTION OF THE INVENTION

Figure 1:
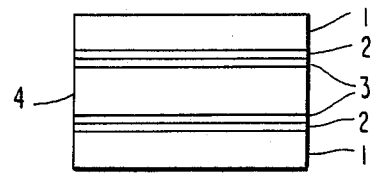
FIG. 1 illustrates a transmission type element having an orientating layer on each of transparent conductive layers.
Figure 2:
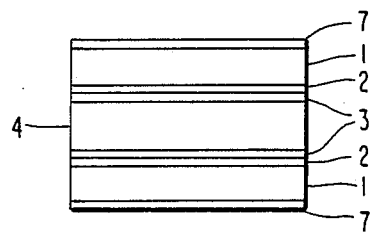
FIG. 2 illustrates a structure as in FIG. 1, further comprising polarizing plates 7.
Figure 3:
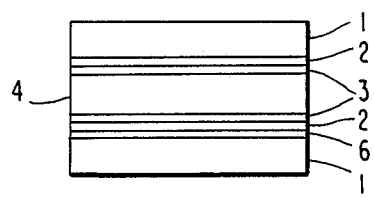
FIG. 3 illustrates a structure as in FIG. 1, further comprising light absorbing layer 6.
Figure 4:
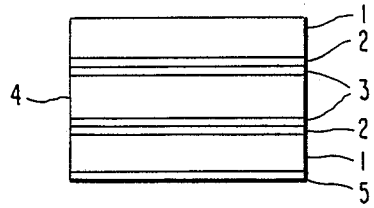
FIG. 4 illustrates a reflection type element having reflective layer 5 on one of two bases.

A working embodiment of the liquid crystal optical element according to the present invention is described below.

A liquid crystal optical element of the present invention comprises a polymeric liquid crystal having a liquid crystal group in the side chain thereof and at least one compound selected from the group consisting of adamantane, an adamantane derivative, terphenyl, and a terphenyl derivative which are sealed within a cell made of glass or plastic bases having a transparent electrode (e.g., indium-tin-oxide (ITO)).

A vertical orientation of the liquid crystal optical element can be attained by applying an electric voltage to the transparent electrode, sliding the bases for the cell in parallel, etc. In this situation, the cell is transparent. Light-scattering or birefringent recorded dots are formed upon locally heating the cell to a temperature around the isotropic liquid $T_{cl}$ (a transformation temperature between liquid crystal phase and isotropic phase) with, for example, a laser beam, followed by cooling. When the recorded area is again heated and then cooled while applying an electrical voltage, it returns to the original transparent and vertically orientated state. This operation corresponds to so-called erasure. Local heating results in local erasure, while heating on the entire area results in entire erasure. The above-described recording and erasure may also be carried out in the reverse order. In this case, vertical orientated transparent recorded dots can be formed by heating and cooling while applying an electrical voltage, and the recorded dots can be erased by merely heating and cooling.

The polymeric liquid crystals which can be used in the present invention include high molecular weight compounds having a liquid crystal group in the side chain thereof, attached to the high molecular weight compound via an alkyl chain. In other words, the side chain type polymeric liquid crystal is composed of a main chain, a spacer, and a liquid crystal group. As the main chain, various high polymers (preferably molecular weight of about 1,000 to 100,000) can be utilized. Among preferred high polymers are polyacrylates, polysiloxanes, polymethacrylates, etc. The spacer preferably includes a methylene chain or oxymethylene chain having from 2 to 18 carbon atoms. If the spacer contains one or no carbon atoms, interference in orientation by the main chain occurs. On the other hand, if the spacer contains 19 or more carbon atoms, orientation does not occur due to crystallization.

The liquid crystal group includes these represented by the formulae shown below.

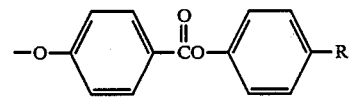

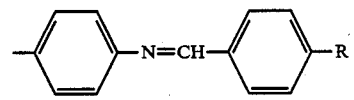

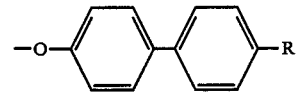

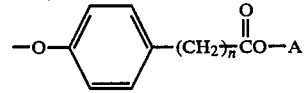

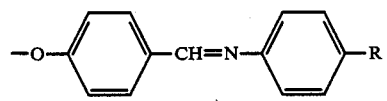

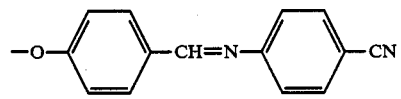

-continued

[structures shown:]

-O-⟨biphenyl⟩

-O-⟨phenyl⟩-⟨cyclohexyl-H⟩

-⟨biphenyl⟩-CN

-O-⟨biphenyl⟩-CN

-CO(=O)-⟨biphenyl⟩-CN

-O-⟨phenyl⟩-OC(=O)-⟨phenyl⟩-R

-O-⟨phenyl⟩-N=CH-⟨phenyl⟩-CN

-O-⟨phenyl⟩-N(→O)=N-⟨phenyl⟩-R

-O-⟨phenyl⟩-C(=O)O-⟨biphenyl⟩-R wherein R represents $OCH_3$, $OC_2H_5$, $OC_3H_7$, $OC_4H_9$, $OC_5H_{11}$, $OC_6H_{13}$, $CH_3$, $C_2H_5$, $C_3H_7$, $C_4H_9$, $C_5H_{11}$, $C_6H_{13}$, $C_7H_{15}$, $C_8H_{17}$, H, Cl, Br, $C_9H_{19}$, $C_{10}H_{21}$, $C_{11}H_{23}$, $C_{12}H_{25}$, $C_{14}H_{29}$, or $C_{16}H_{33}$; and A represents

[steroid structure with substituents $CH_3$, $CH_3$, $H_3C$, $CH(CH_2)_3$-CH($CH_3$)$CH_3$]

The polyacrylate or polymethacrylate main chain may be in the form of a copolymer (15/85 to 85/15 by weight) with a comonomer having, as a side chain, an alkyl chain, an aryl group, etc. The said main chain being different from the side chain which is composed of a spacer and a liquid crystal group. The polymeric liquid crystal may be mixed with low molecular weight liquid crystals, polymers, dyes, etc., in a proportion that would not impair the liquid crystal state, preferably low molecular weight liquid crystals in an amount of 0.5 to 30 wt%, polymers in an amount of 0.1 to 5 wt% and dyes in an amount of 0.02 to 12 wt%.

The orientation state of the above-described polymeric liquid crystal which is achieved by application of an electrical field, etc., can be improved by incorporating into the polymeric liquid crystal at least one compound selected from the group consisting of adamantane, an adamantane derivative, terphenyl, and a terphenyl derivative in an amount of from 0.01 to 15% by weight, and preferably from 0.1 to 10% by weight, based on the weight of the polymeric liquid crystal.

Adamantane is a compound represented by formula (I):

$$\text{(adamantane structure)} \quad (I)$$

Specific examples of preferred adamantane or its derivatives are adamantane, 1,3-dimethyladamantane, 1-bromoadamantane, 1-chloroadamantane, 2-bromoadamantane, 2-chloroadamantane, 2-adamantanol, 1,3-dimethyladamantane-5,7-diol, 1-hydroxymethyladamantane, 1-cyanoadamantane, ethyl 1-adamantanecarboxylate, 1-acetylaminoadamantane, and 1-aminomethyladamantane.

Preferred examples of the terphenyl or terphenyl derivatives to be incorporated into the polymeric liquid crystal are an o-, m- or p-terphenyl or a derivative thereof which is represented by formula (II):

$$X-\text{⟨terphenyl⟩}-Y \quad (II)$$

wherein X and Y each preferably represents a hydrogen atom, an alkyl group, an oxyalkyl group, a halogen atom, a nitrile group, a nitro group, or an alkyl ester group.

In formula (II), the alkyl group contains from 1 to 9 carbon atoms. If it contains 10 or more carbon atoms, the compound of formula (II) shows too low solubility in the polymeric liquid crystal to produce expected effects. The oxyalkyl group contains from 1 to 12 carbon atoms. If it has 13 or more carbon atoms, the compound of formula (II) also shows too low solubility in the polymeric liquid crystal to be practically used. The alkyl moiety of the alkyl ester group contains from 1 to 5 carbon atoms.

Specific examples of preferred terphenyl or terphenyl derivatives thereof are shown below.

[terphenyl]

$CH_3$-[terphenyl]-$CH_3$ $C_2H_5$-[terphenyl]-$C_2H_5$

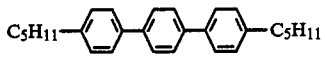
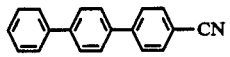
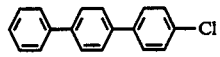
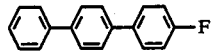
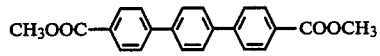
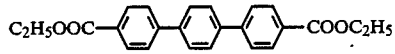
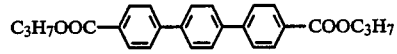
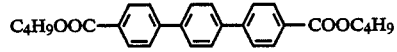
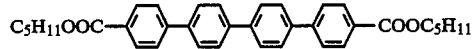
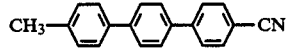
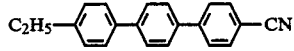
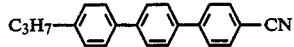
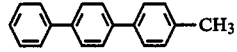
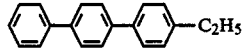
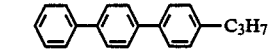
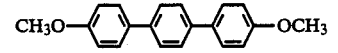
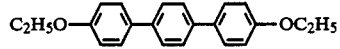
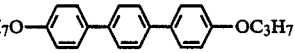

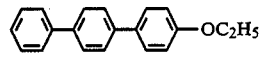
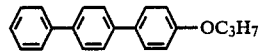

The amount of these adamantane and terphenyl compounds to be incorporated into the polymeric liquid crystal usually ranges from 0.01 to 15% by weight, and preferably from 0.1 to 10% by weight, based on the weight of the polymeric liquid crystal. If it is less than 0.01% by weight, no improvement in orientation properties of the polymeric liquid crystal can be achieved. If it exceeds 15% by weight, a part of the compound undergoes crystallization through repetition of recording and erasure, resulting in errors on reproduction of recorded information or deterioration of image quality on display of recorded images, etc.

These adamantane and terphenyl compounds may be used either individually or in combination. In the latter case, it should be noted that the total amount of these compounds combined preferably falls within the range of from 0.01 to 15% by weight.

The bases for the cell to be used in the present invention include a glass plate, a plastic sheet, etc. Specific examples of the plastics to be used are cellulose derivatives (e.g., nitrocellulose, cellulose triacetate, etc.); polyesters (e.g., polyethylene terephthalate (PET), polyethylene naphthalate, etc.); polycarbonate; polyolefins (e.g., polypropylene, polyethylene, etc.); polyvinyl alcohol; polyvinyl chloride; polyvinylidene chloride; nylon; polystyrene; polyether sulfone; etc. In case where orientation is effected by electrical field application, it is necessary to provide a transparent electrode layer on the base. The transparent electrode layer to be use includes an oxide of indium, tin, etc., as commonly employed. In the case of using a polymeric liquid crystal composition showing positive dielectric anisotropy, the liquid crystal is vertically orientated. In order to make the vertical orientation uniform, it is possible to use a vertical orientating agent. Examples of the vertical orientating agent to be used include stearic acid, hexadecyltrimethylammonium bromide, a basic chromium carboxylate complex, an organosilane (e.g., DMOAP), hexamethyldisiloxane, dicyclohexane, perfluorodimethylcyclohexane, tetrafluoroethylene, polytetrafluoroethylene, Versamide 100, octadecylmalonic acid, etc.

The polymeric liquid crystal composition can be supported between the bases by coating the composition on one of the bases with the aid of a solvent or coating the composition in a molten state at a temperature above $T_{cl}$ of, for example, the liquid crystal siloxane oligomer, and evaporating the solvent or returning the molten state to the original state at room temperature, followed by adhering the other base.

Phase transition of the liquid crystal layer by heat application is illustrated below. In the cases where opaque recording dots are to be formed on a transparent background in an orientated state, heating can be effected by the use of a laser beam, a flash lamp (e.g., a xenon lamp), a heating head, or a scanning electrode as a heating element. Of these, a laser beam is preferred from the standpoint of achieving high density recording. In using a laser beam, a dye capable of efficiently converting light to heat may be incorporated into, for example, a liquid crystal siloxane oligomer layer, or a thin layer comprising such a dye may be formed on the base as a light absorbing layer. Dyes to be used for this purpose are those having an absorption, and preferably an absorption maximum, in the wavelength of the laser beam used. For example, dyes suitable in using a YAG laser having a wavelength of 1.06 μm include "NKX 114G" (a trade name produced by Nippon Kanko Shikiso Kenkyusho) represented by the following formula:

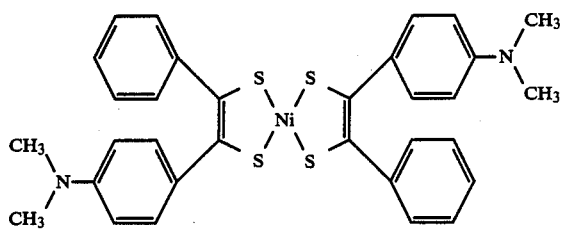

When the laser has this particular wavelength, indium or tin oxide used as a transparent electrode may serve as a light absorber in some cases so that an independent light absorbing layer would not be necessary.

On the other hand, in cases where transparent and vertically orientated recorded dots are to be formed on the background of a non-orientated state showing opaqueness or birefringence, the liquid crystal layer is heated with the above-recited laser beam, flash lamp, heating head, or scanning electrode serving as a heating element while applying an electrical field and then cooled to form vertically orientated recorded dots.

For erasure of the thus-recorded dots, the opaque dots formed on the transparent background under an orientated state are heated while imposing an electrical voltage, followed by cooling. The transparent dots formed on the opaque background under a non-orientated state showing opaqueness or birefringence are merely heated and then cooled. The heating means to be used for erasure may be the same as that used for the formation of recorded dots.

The electrical voltage to be applied is preferably not more than $10^7$ V/cm for prevention of a short circuit. The electricity may be either a direct current or an alternating current, with the latter being desirable from the standpoint of preventing deterioration with time. The frequency is preferably between 10 Hz and 50 KHz. If it is less than 10 Hz, the resulting element is apt to be deteriorated with time. If it exceeds 50 KHz, orientation tends to be insufficient.

Reproduction or reading of the recorded information can be carried out by making use of an optical transmittance or a reflectance. Reading can also be effected by combining the cell with a polarizing plate or placing the cell under a crossed nicol.

Although the foregoing description has been directed to a recording medium to which the present invention is applied, the optical element according to the present invention can also be utilized as a projection type display element, in which a character or graphic image is recorded on the cell through the same process as described above and the recorded image is projected on a screen by means of a halogen lamp, etc.

The present invention is now illustrated in greater detail with reference to the following examples and comparative example, but it should be understood that the present invention is not construed to be limited thereto.

EXAMPLE 1

Cetyltrimethylammonium bromide was coated as an orientating agent on a transparent conductive PET base on its transparent electrode side to form an orientating layer. A polymeric liquid crystal composition comprising a polymeric liquid crystal having the repeating unit shown below and 2% by weight of adamantane was sealed up between two of the resulting bases to form a liquid crystal layer having a thickness of 5 μm.

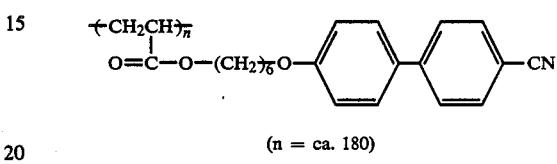

(n = ca. 180)

The resulting liquid crystal cell was heated at 130° C., and an electrical voltage of 100 Hz and 50 V was applied thereto to cause vertical orientation. When the cell was viewed through a crossed nicol, the liquid crystal layer was found to have a uniform vertical orientation state with little birefringence and no white turbidity.

EXAMPLE 2

The liquid crystal cell was produced in the same manner as in Example 1, except for replacing adamantane as used in Example 1, with the same amount of terphenyl and changing the thickness of the liquid crystal layer to 7 μm.

The resulting liquid crystal cell was heated t 130° C., and an electrical voltage of 100 Hz and 50 V was applied thereto to cause vertical orientation. When the cell was viewed through a crossed nicol, the liquid crystal layer was found to have a uniform vertical orientation state with little birefringence and no white turbidity.

COMPARATIVE EXAMPLE

A liquid crytsal cell was produced in the same manner as in Example 1, excluding the use of an additive such as adamantane and terphenyl.

When the resulting liquid crystal cell was orientated in the same manner as in Example 1, the liquid crystal layer was found to contain white turbidity clearly appreciable to the eye, indicating considerable non-uniformity in vertical orientation.

As is apparent from the examples and comparative example, orientation properties of polymeric liquid crystals can be markedly improved by incorporating adamantane, terphenyl, or a derivative of these compounds into polymeric liquid crystals. Therefore, the present invvention makes a great contribution particularly with regard to improving the reliability of photorecording medium of high recording density or display devices.

While the invention has been described in detail and with reference to specific embodiments thereof, it will be apparent to one skilled in the art that various changes and modifications can be made therein without departing from the spirit and scope thereof.

What is claimed is:

1. A liquid crystal optical element comprising a nematic side chain type polymeric liquid crystal having added therein at least one compound selected from the group consisting of:
   (a) adamantane, 1,3-dimethyladamantane, 1-bromoadamantane, 1-chloroadamantane, 2-bromoadamantane, 2-chloroadamantane, 2-adamantanol, 1,3-dimethyladamantane-5,7-diol, 1-hydroxymethyladamantane, 1-cyanoadamantane, ethyl 1-adamantanecarboxylate, 1-acetylaminoadamantane, and 1-aminomethyladamantane, and
   (b) terphenyl or a terphenyl derivative represented by the formula:

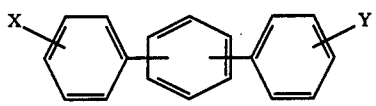

wherein X and Y each represents a hydrogen atom, an alkyl group, an oxyalkyl group, a halogen atom, a nitrile group, a nitro group, or an alkyl ester group,
wherein said compound or compounds is or are present in a total amount of from 0.01 to 15% by weight based on the polymeric liquid crystal.

2. A liquid crystal optical element as claimed in claim 1, wherein said compound or compounds is or are present in an amount of from 0.1 to 10% by weight based on the polymeric liquid crystal.

3. A liquid crystal optical element as claimed in claim 1, wherein said alkyl group contains from 1 to 9 carbon atoms, said oxyalkyl group contains from 1 to 12 carbon atoms, and said alkyl ester group contains from 1 to 5 carbon atoms in the alkyl moiety of said alkyl ester group.

4. A liquid crystal optical element as claimed in claim 1, wherein the side chain type polymeric liquid crystal is composed of a main chain, a spacer, and a liquid crystal group.

5. A liquid crystal optical element as claimed in claim 4, wherein the main chain is a homopolymer or copolymer comprising acrylic, siloxane, or methacrylic monomeric units.

6. A liquid crystal optical element as claimed in claim 4, wherein the spacer includes a methylene chain or oxymethylene chain having from 2 to 18 carbon atoms.

7. An information recording medium, wherein the liquid crystal optical element as claimed in claim 1 is provided between bases in a cell having a transparent electrode.

8. An information recording medium as claimed in claim 7, wherein the erasure of opaque dots formed on the transparent background is accomplished through the use of an electrical voltage of not more than $10^7$ V/cm, a frequency of 10 Hz to 50 KHz, and an electrical field application under heating.

9. An information recording medium as claimed in claim 7, wherein a vertical orientation state of the liquid crystal optical element may be attained by applying an electric voltage to the transparent electrode or sliding the bases for the cell in parallel.

10. An information recording medium as claimed in claim 7, wherein said compound or compounds added therein are selected from the group consisting of adamantane, 1,3-dimethyladamantane, 1-bromoadamantane, 1-chloroadamantane, 2-bromoadamantane, 2-chloroadamantane, 2-adamantanol, 1,3-dimethyladamantane-5,7-diol, 1-hydroxymethyladamantane, 1-cyanoadamantane, ethyl 1-adamantanecarboxylate, 1-acetylaminoadamantane, and 1-aminomethyladamantane.

* * * * *